United States Patent
Yang et al.

(10) Patent No.: US 9,047,049 B2
(45) Date of Patent: Jun. 2, 2015

(54) DOCKING STATION, ELECTRONIC SYSTEM AND OPERATING METHOD OF RELEASING CONNECTION BETWEEN TWO DEVICES

(75) Inventors: Hsiang-Chun Yang, Taipei (TW); Chia-Ying Chen, Taipei (TW); Chih-Wei Lee, Taipei (TW); Cheng-Hsun Lee, Taipei (TW); Shih-Huei Liu, Taipei (TW); Ping-Huei Lee, Taipei (TW); Er-Jie Tsai, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 369 days.

(21) Appl. No.: 13/615,620

(22) Filed: Sep. 14, 2012

(65) Prior Publication Data

US 2013/0155583 A1 Jun. 20, 2013

Related U.S. Application Data

(60) Provisional application No. 61/578,211, filed on Dec. 20, 2011.

(51) Int. Cl.
*H05K 5/00* (2006.01)
*G06F 1/16* (2006.01)

(52) U.S. Cl.
CPC .......... *G06F 1/1626* (2013.01); *Y10T 29/49815* (2015.01); *G06F 1/1632* (2013.01)

(58) Field of Classification Search
CPC .............................. G06F 1/1632; G06F 1/1626
USPC .......................... 361/679.01, 679.41, 679.43
See application file for complete search history.

(56) References Cited

U.S. PATENT DOCUMENTS

| 7,599,178 B2 * | 10/2009 | Huang et al. ............. 361/679.43 |
| 2010/0181450 A1 * | 7/2010 | Hulick et al. ............. 248/229.2 |

FOREIGN PATENT DOCUMENTS

TW M397130 1/2011

* cited by examiner

*Primary Examiner* — Jayprakash N Gandhi
*Assistant Examiner* — Mukund G Patel
(74) *Attorney, Agent, or Firm* — Jianq Chyun IP Office

(57) ABSTRACT

A docking station suitable for detachably assembling to an electronic device is provided. A bracket of the docking station includes a housing, a pushing element, a restoring element, and a main hook. When the pushing element is slid relative to the housing through the restoring element so the main hook is buckled to a main groove of the electronic device, a main hook relation between the bracket and the electronic device is established. When the pushing element is slid relative to the housing so the main hook departs from the main groove, a secondary hook of the docking station establishes a secondary hook relation between the bracket and the electronic device. When the electronic device is removed from the bracket until the secondary hook relation between the bracket and the electronic device is released, the restoring element restores the pushing element relative to the housing.

25 Claims, 19 Drawing Sheets

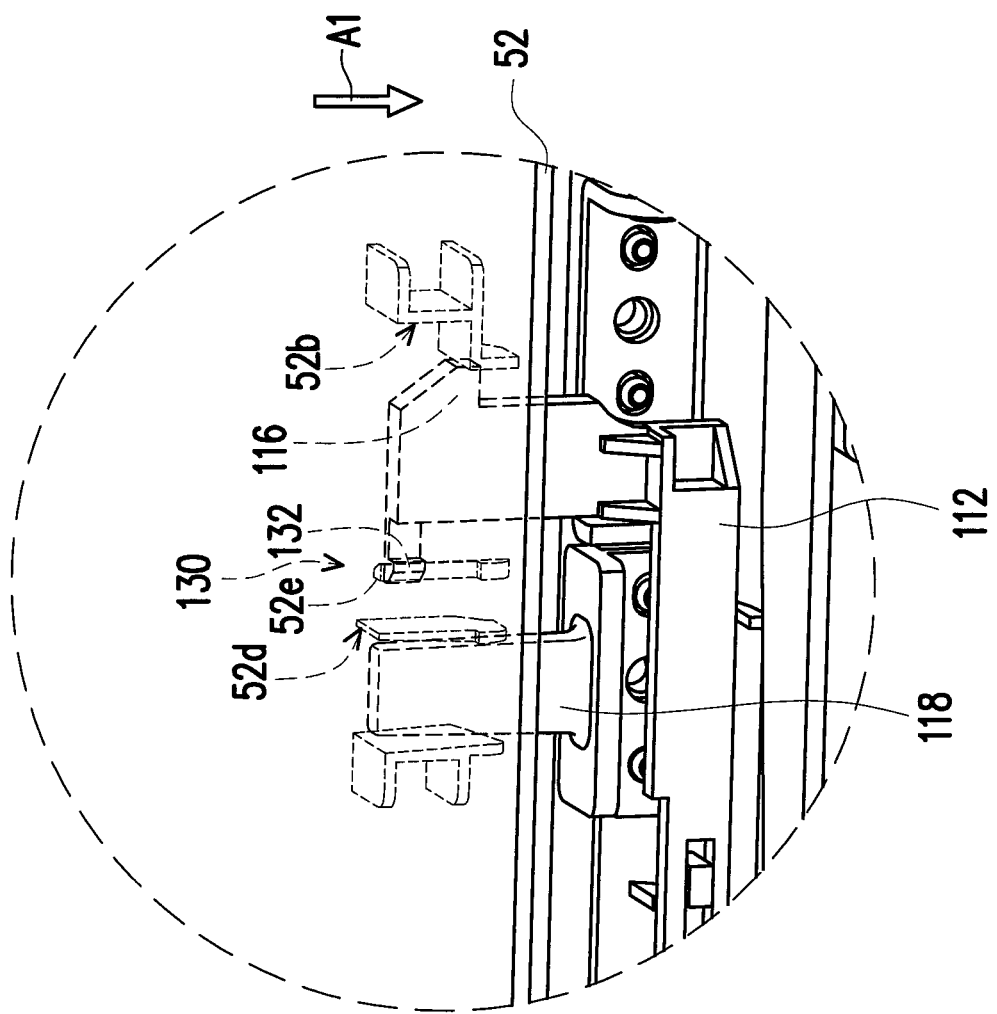

DOCKING STATION, ELECTRONIC SYSTEM AND OPERATING METHOD OF RELEASING CONNECTION BETWEEN TWO DEVICES

CROSS-REFERENCE TO RELATED APPLICATION

This application claims the priority benefits of U.S. provisional application Ser. No. 61/578,211, filed on Dec. 20, 2011. The entirety of the above-mentioned patent applications is hereby incorporated by reference herein and made a part of this specification.

BACKGROUND OF THE INVENTION

1. Technical Field

The invention relates generally to an electronic system, and more particularly to an electronic system and a docking station thereof.

2. Related Art

With the advancement of technology, the tablet device has been diversified to include tablet PCs, for example. Compared with traditional desktop PCs, the main advantage of the tablet device is in its user portability, as well as the convenience in computing provided to the user under different work environments. However, the tablet device is limited by its requirement for thinness and lightness, and thus its functionality and expandability cannot compare with desktop PCs having larger operating space.

Accordingly, a docking station has been proposed in the conventional arts. The user can place the tablet device on the docking station, and a keyboard can be configured on the docking station. The user can thus employ the docking station to stand the tablet device, use the keyboard to operate the tablet device, and view the images displayed by the tablet device. Since the tablet device can be used like a notebook PC by employing the docking station, the value and convenience of the tablet device to the user are enhanced. However, when the user removes the tablet device from the docking station, the user is required to operate with both hands. That is, one hand releases a hook mechanism and ensures a hook relation between the tablet device and the docking station does not return. At the same time, another hand grabs the tablet device to remove the tablet device from the docking station. As such, the user is inconvenienced when removing the tablet device from the docking station.

SUMMARY OF THE INVENTION

The invention provides a docking station suitable for detachably assembling to an electronic device and for removing the electronic device from the docking station with ease.

The invention provides an electronic system including an electronic device suitable for removal from a docking station with ease.

The invention provides an operating method of releasing connection between two devices with one hand.

The invention provides a docking station suitable for detachably assembling to an electronic device. The electronic device has a main groove. The docking station includes a bracket and a secondary hook mechanism. The bracket includes a housing, a pushing element, a restoring element, and a main hook. The pushing element is slidably disposed in the housing. The restoring element is disposed between the housing and the pushing element to restore the pushing element relative to the housing. The main hook is fixed to the pushing element and is suitable for buckling to the main groove. When the pushing element is slid relative to the housing through the restoring element so the main hook is buckled to the main groove, a main hook relation between the bracket and the electronic device is established. The secondary hook mechanism is connected to the bracket. When the pushing element is slid relative to the housing so the main hook departs from the main groove, the main hook relation between the bracket and the electronic device is released. Moreover, the secondary hook mechanism establishes a secondary hook relation between the bracket and the electronic device. When the electronic device is removed from the bracket until the secondary hook relation between the bracket and the electronic device is released, the restoring element restores the pushing element relative to the housing.

The invention provides an electronic system including an electronic device and a docking station. The electronic device has a main groove. The docking station is suitable for detachably assembling to the electronic device. The docking station includes a bracket and a secondary hook mechanism. The bracket includes a housing, a pushing element, a restoring element, and a main hook. The pushing element is slidably disposed in the housing. The restoring element is disposed between the housing and the pushing element to restore the pushing element relative to the housing. The main hook is fixed to the pushing element and buckled to the main groove. When the pushing element is slid relative to the housing through the restoring element so the main hook is buckled to the main groove, a main hook relation between the bracket and the electronic device is established. The secondary hook mechanism is connected to the bracket. When the pushing element is slid relative to the housing so the main hook departs from the main groove, the main hook relation between the bracket and the electronic device is released. Moreover, the secondary hook mechanism establishes a secondary hook relation between the bracket and the electronic device. When the electronic device is removed from the bracket until the secondary hook relation between the bracket and the electronic device is released, the restoring element restores the pushing element relative to the housing.

The invention provides an operating method of releasing connection between two devices, adapted for detaching a first device from a second device with one hand. The second device has a housing. A pushing element is moved to a unlock position. A main hook relation between the first device and the second device is then released, and a secondary hook relation between the first device and the second device is established, such that the pushing element stays at the unlock position and no longer slides relative to the housing. A single force is then applied to the first device so the first device is dismounted from the second device.

In summary, by adding the secondary hook mechanism of the docking station and the operating method of releasing connection between two devices performed by the secondary hook mechanism, embodiments of the invention can enhance the convenience of removing the electronic device from the bracket. When the main hook relation between the bracket and the electronic device is released so the user can remove the electronic device from the bracket, at the same time, due to the secondary hook relation being established between the bracket and the electronic device, the pushing element no longer slides relative to the housing, and the release of the main hook relation between the bracket and the electronic device is ensured. Accordingly, the user does not need to apply other external force to prevent the sliding of the pushing element relative to the housing, and the user only needs to make sure that the electronic device is removed from the bracket. Therefore, the user can remove the electronic device from the docking station using only one hand, without the need of the other hand to ensure the release of the main hook relation between the electronic device and the docking station.

Moreover, when the electronic device is removed from the docking station until the secondary hook relation between the bracket and the electronic device is released, the restoring element can restore the pushing element relative to the housing. Accordingly, the user does not need to apply other external force for the self-restoration of the secondary hook mechanism of the bracket.

Several exemplary embodiments accompanied with figures are described in detail below to further describe the disclosure in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 5A-5D are respective partial enlarged views of the electronic device being assembled to the docking station.

DESCRIPTION OF EMBODIMENTS

Figure 1A:
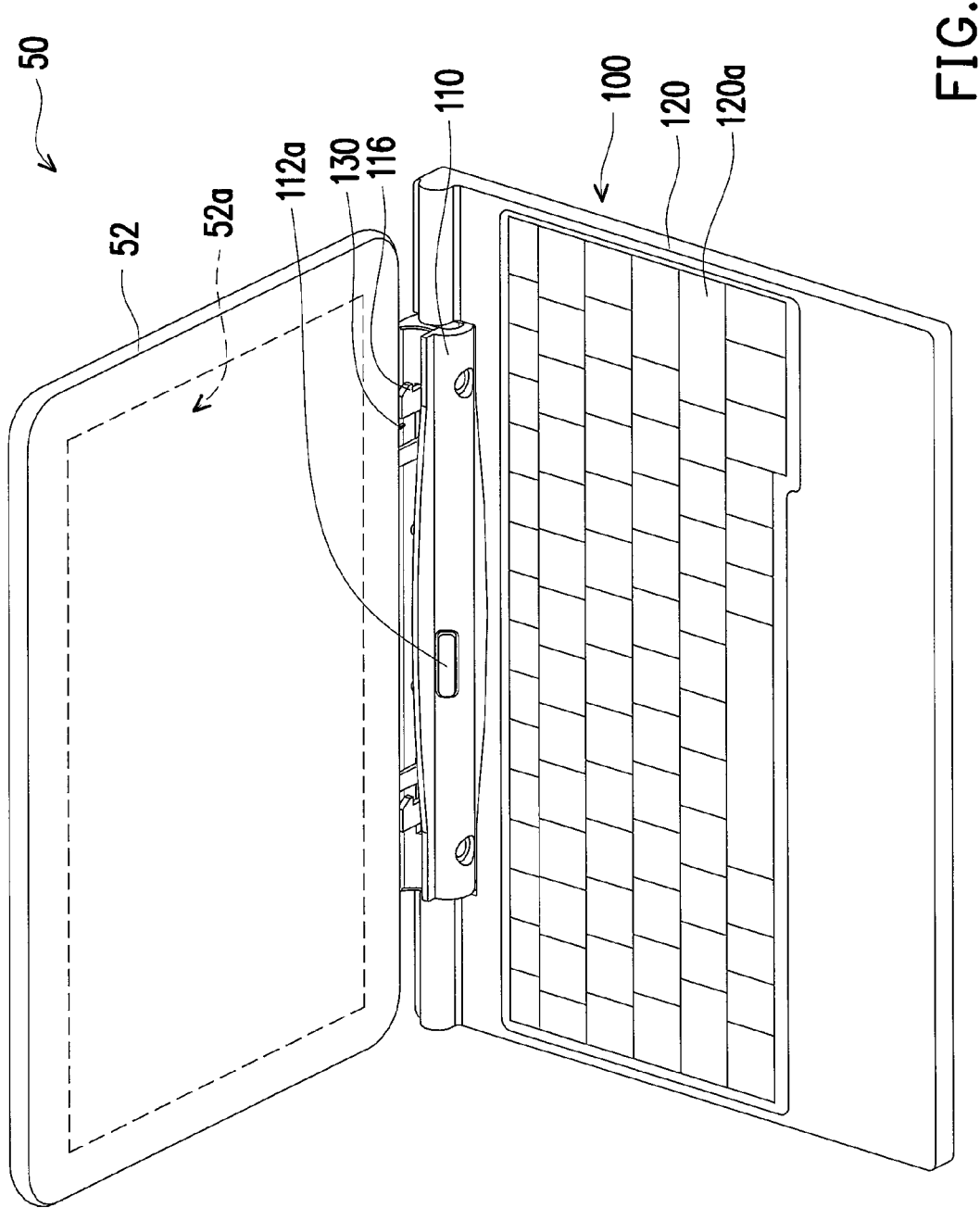
FIGS. 1A and 1B are perspective views respectively illustrating an electronic system before and after assembly according to an embodiment of the invention.
Figure 1B:
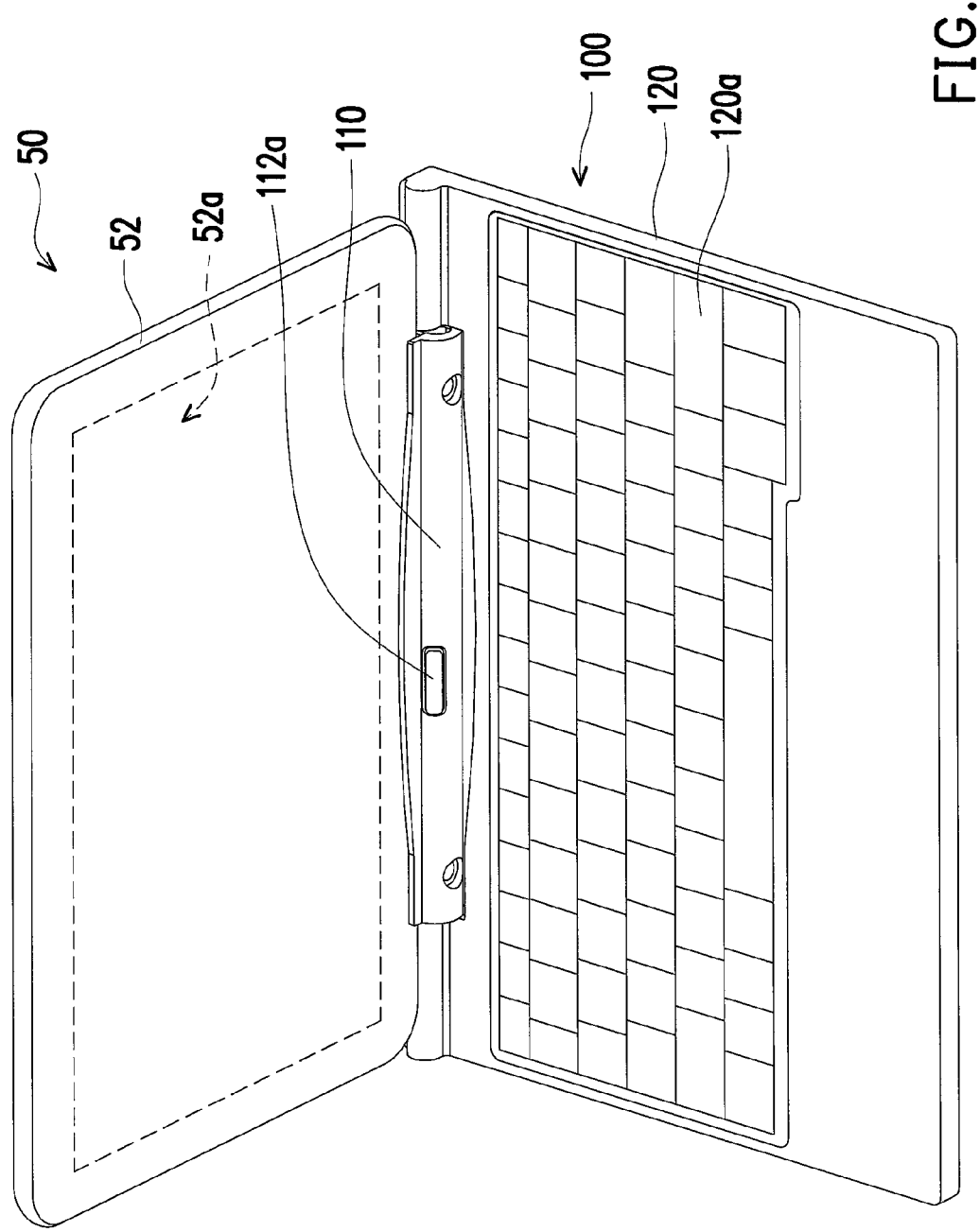

FIGS. 1A and 1B are perspective views respectively illustrating an electronic system before and after assembly according to an embodiment of the invention. With reference to FIGS. 1A and 1B, in the present embodiment, an electronic system 50 includes an electronic device 52 and a docking station 100. The docking station 100 includes a bracket 110, a base 120, and a secondary hook mechanism 130, in which the base 120 is pivotally disposed to the bracket 110.

The electronic device 52 is a tablet PC, for example. The docking station 100 can detachably assemble to the electronic device 52 to serve as an extension module of the electronic device 52. Moreover, by employing the docking station 100, the functionalities of the electronic device 52 are expanded, and the value and convenience of the electronic device 52 to the user are enhanced. For example, the electronic device 52 may include a display screen 52a, and the base 120 may include a keyboard 120a. Accordingly, the user can use the keyboard 120a to operate the electronic system 50 and view the images displayed by the display screen 52a.

Figure 2:
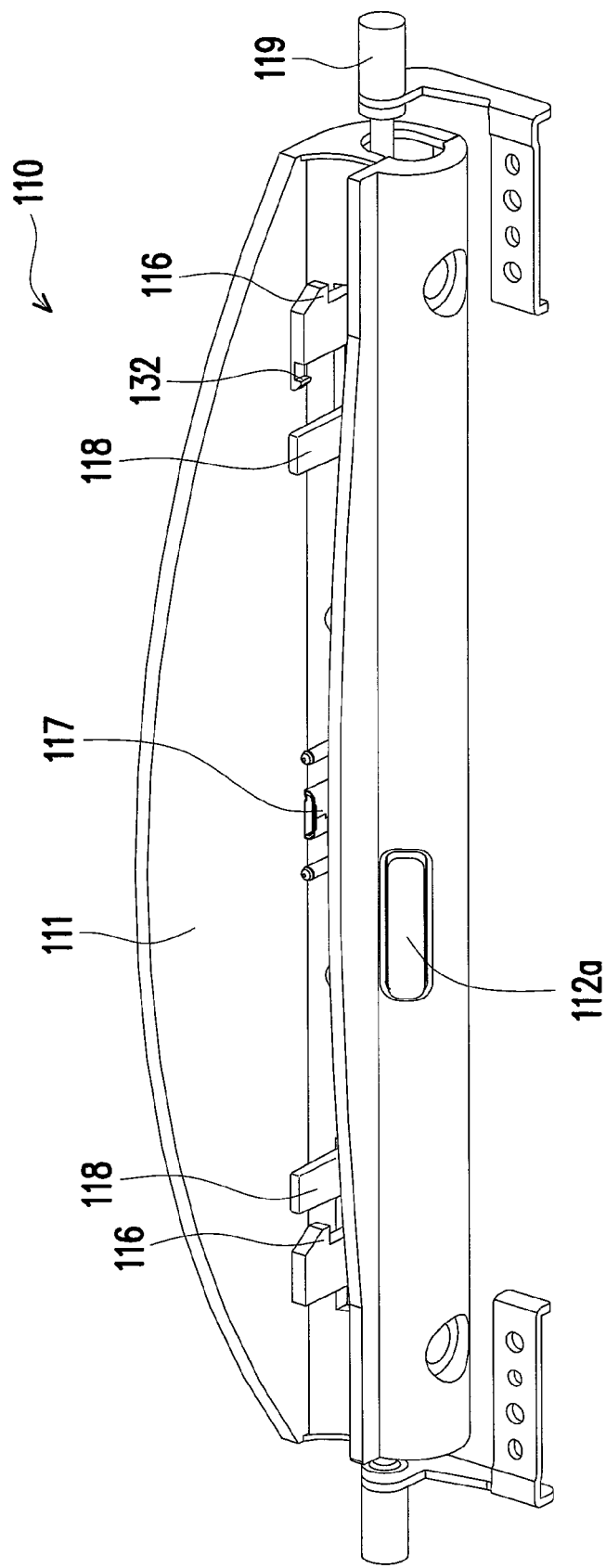
FIG. 2 is a perspective view of the bracket depicted in FIG. 1A.
Figure 3:
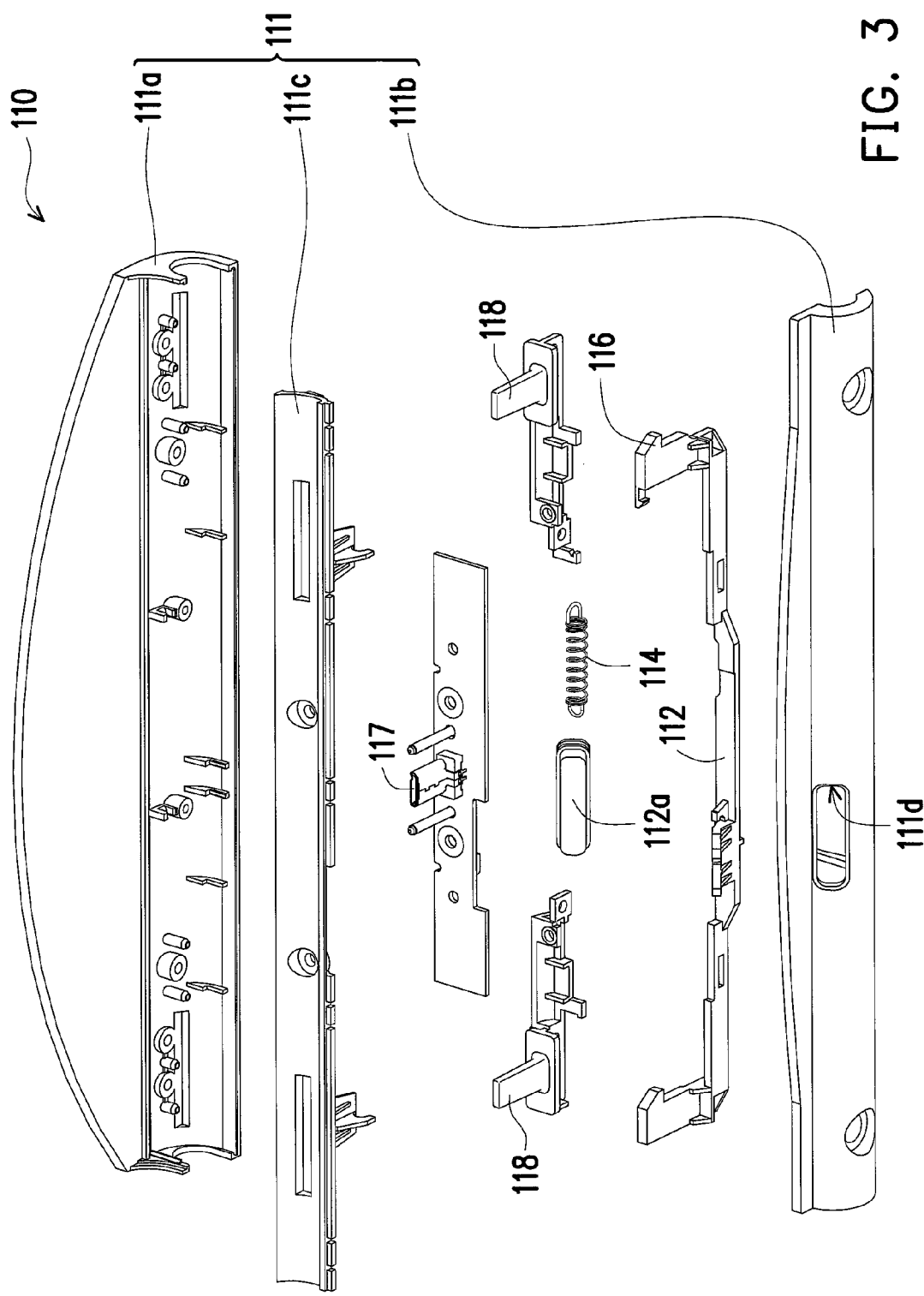
FIG. 3 is an exploded view of the bracket depicted in FIG. 2.

FIG. 2 is a perspective view of the bracket depicted in FIG. 1A. FIG. 3 is an exploded view of the bracket depicted in FIG. 2. Referring to FIGS. 2 and 3, in the present embodiment, the bracket 110 includes a housing 111, a pushing element 112, a restoring element 114, a main hook 116, a bracket connector 117, and a pair of pivoting elements 119. The housing 111 in the present embodiment includes a front portion 111a, a back portion 111b, and a top portion 111c. The pushing element 112 can be slidably disposed in the housing 111. The main hook 116 is fixed to the pushing element 112. The restoring element 114 is disposed between the housing 111 and the pushing element 112 to restore the pushing element 112 relative to the housing 111. The bracket connector 117 is disposed on the bracket 110. Moreover, the pair of pivoting elements 119 are assembled to the base 120.

In some embodiments of the invention, the main hook 116 of the docking station 100 is used for assembling to the electronic device 52. Further description is provided below with reference to the drawings.

Figure 4:
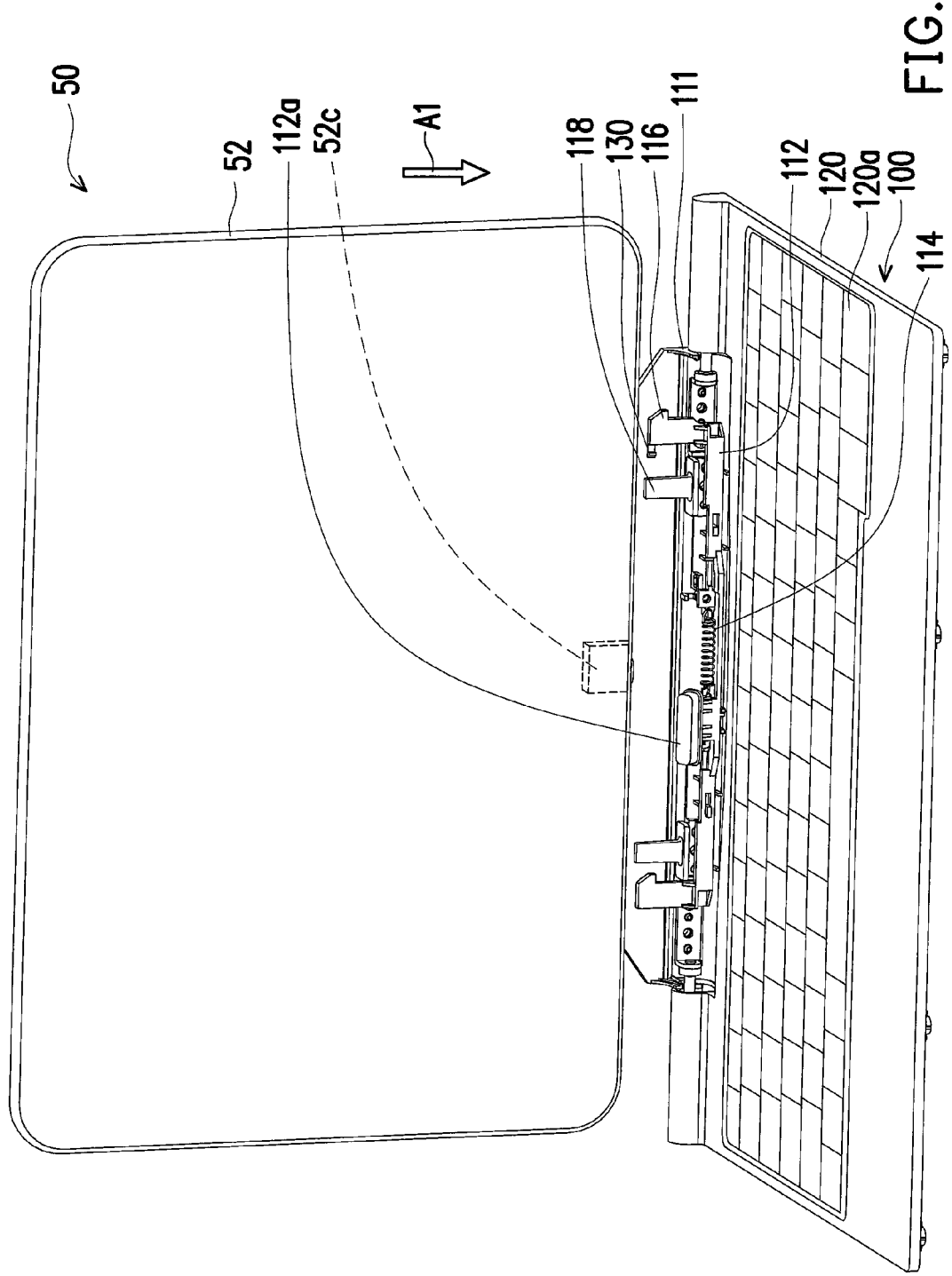
FIG. 4 is a schematic view of the electronic device being assembled to the docking station depicted in FIG. 1A.
Figure 5A:
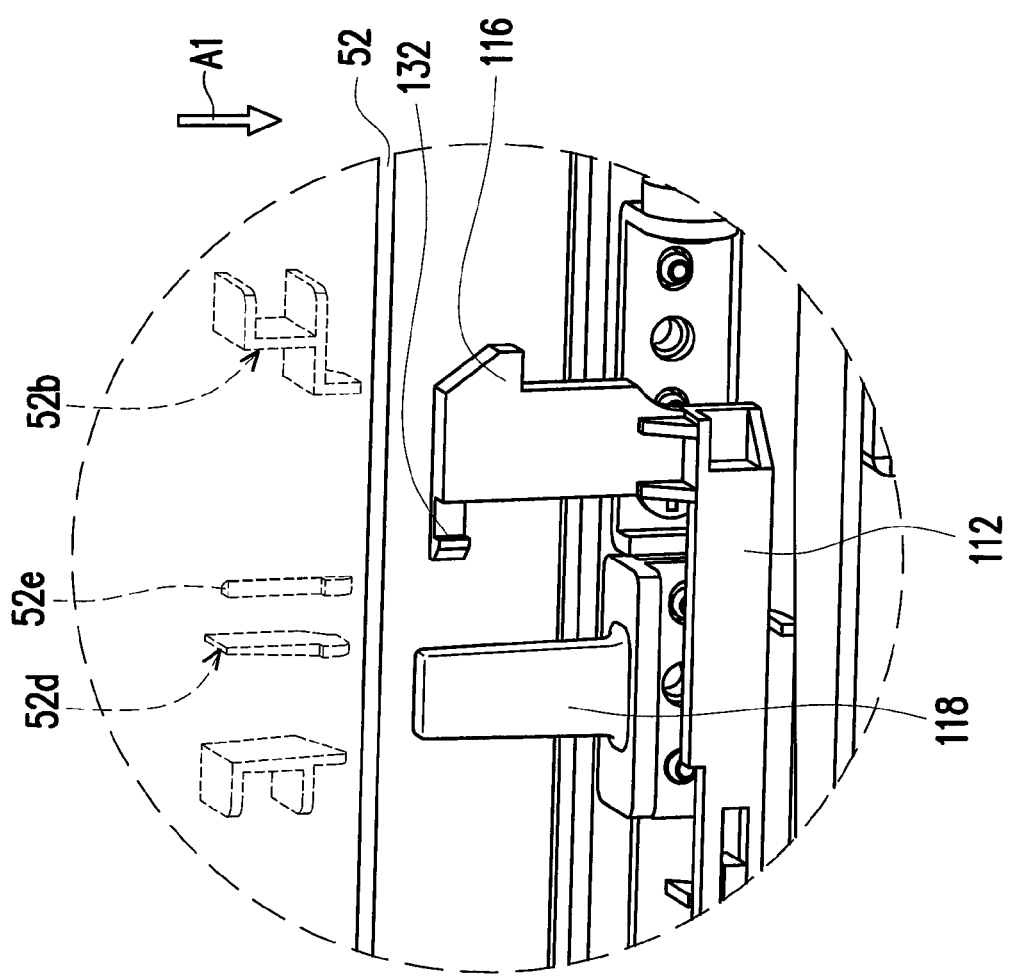
Figure 5B:
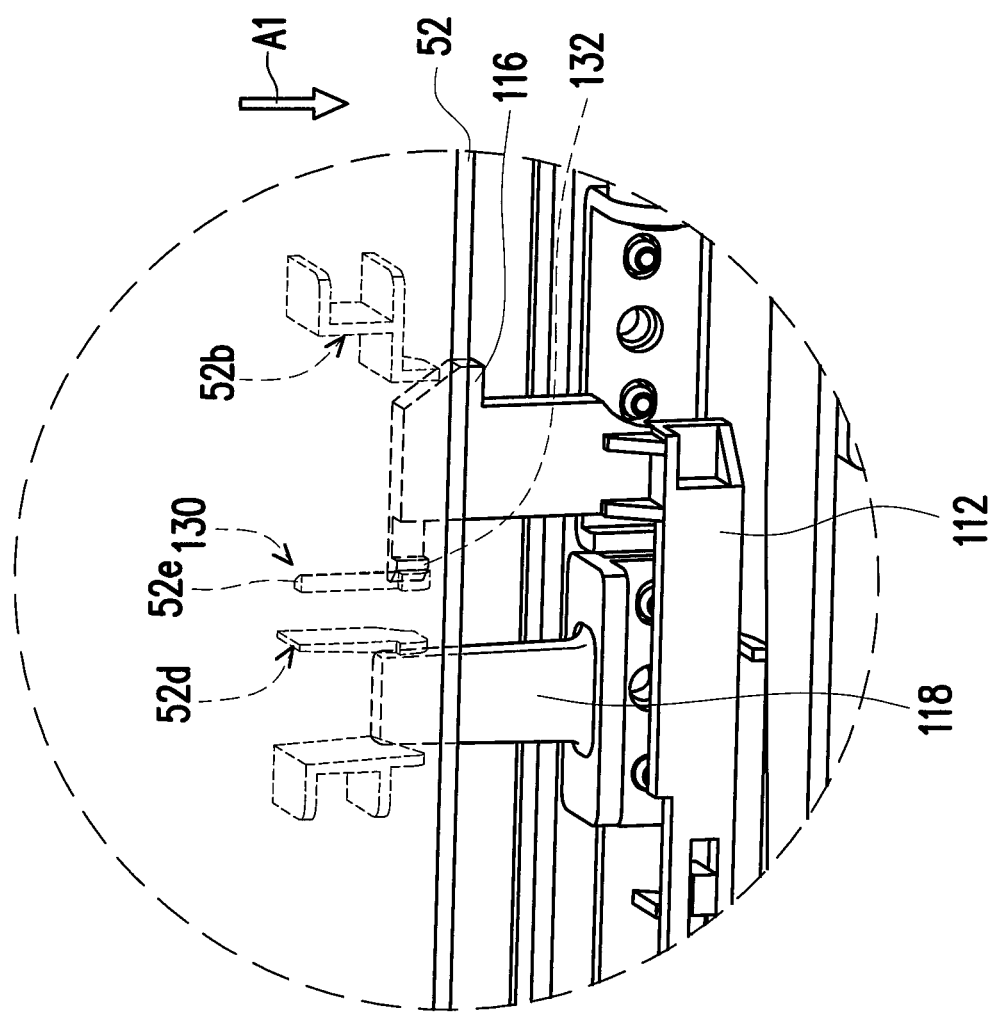

FIG. 4 is a schematic view of the electronic device and the docking station depicted in FIG. 1A before assembly. FIGS. 5A-5D are respective partial enlarged views of the electronic device being assembled to the docking station. With reference to FIGS. 2, 3, 4, and 5A-5D, in the present embodiment, the electronic device 52 has a main groove 52b and a device connector 52c. The main groove 52b is suitable for buckling to the main hook 116 of the bracket 110. Moreover, the bracket connector 117 shown in FIG. 3 is electrically connected to the device connector 52c. The electronic device 52 of the present embodiment is assembled to the docking station 100 along a direction of an arrow A1 shown in FIG. 5A. The electronic device 52 then engages the main hook 116 as shown in FIGS. 5B to 5C, so that the pushing element 112 slides relative to the housing 111. When the pushing element 112 is slid relative to the housing 111 through the restoring element 114 along a direction of an arrow A2 shown in FIG. 5D so the main hook 116 is buckled to the main groove 52b, a main hook relation between the bracket 110 and the electronic device 52 is established. Accordingly, the assembly of the electronic device 52 to the bracket 110 is essentially complete. To assemble the electronic device 52 to the docking station 100 with this configuration, the user only needs to ensure the hook relation between the main groove 52b of the electronic device 52 and the main hook 116 of the docking station 100.

Moreover, the bracket 110 of the present embodiment further includes a supporting element 118 fixed to the pushing element 112. The electronic device 52 also has a fastening groove 52d. When the electronic device 52 is assembled to the bracket 110, the supporting element 118 is inserted in the fastening groove 52d to support the electronic device 52.

In some embodiments of the invention, the secondary hook mechanism 130 of the docking station 100 is added for enhancing the convenience of removing the electronic device 52 from the bracket 110 of the docking station 100. Further description is provided below with reference to the drawings.

Figure 5D:
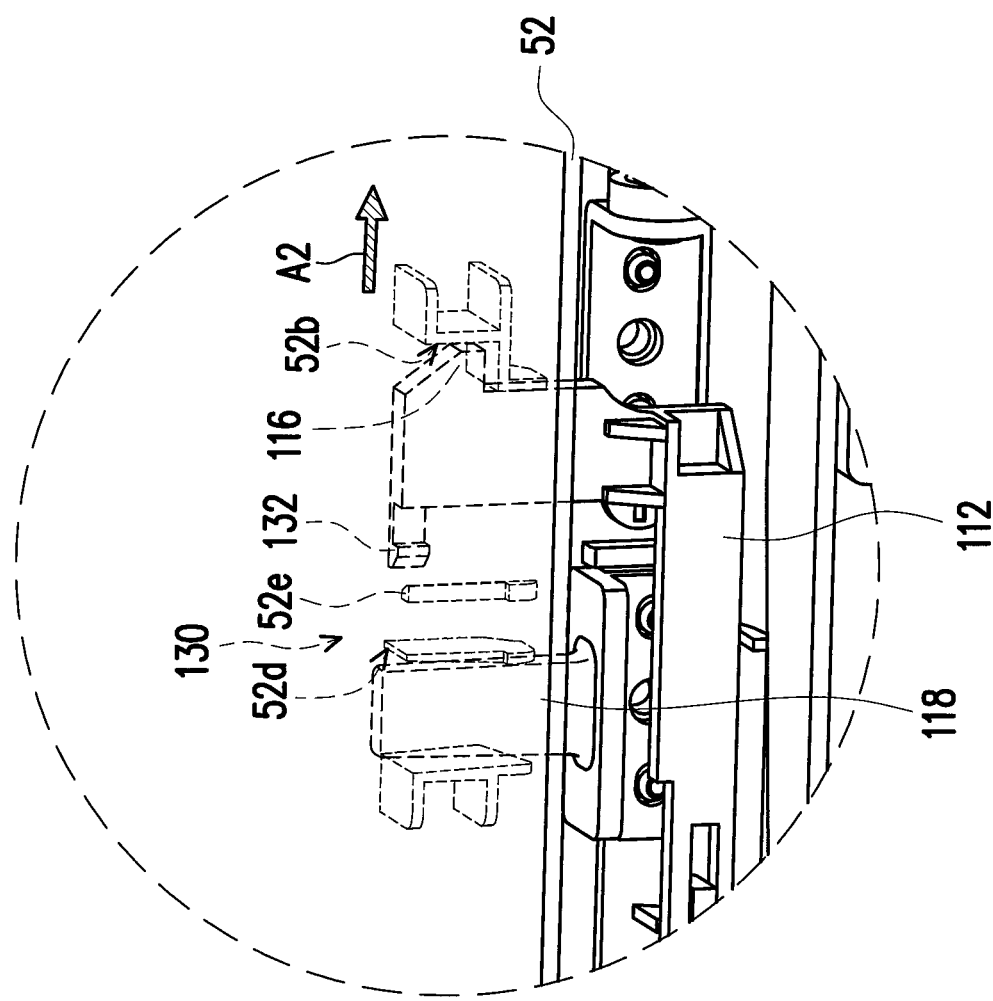
Figure 5E:
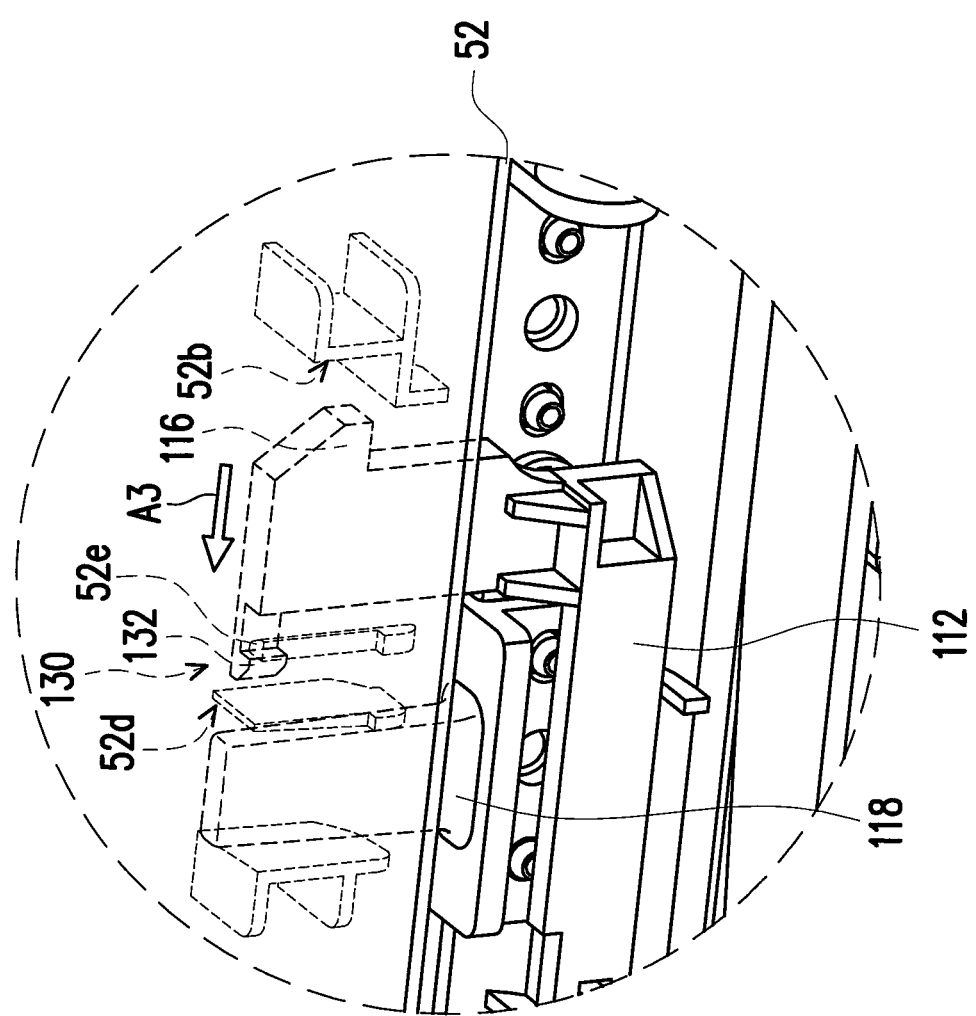
FIGS. 5E-5G are respective partial enlarged views of the electronic device being removed from the docking station.
Figure 5F:
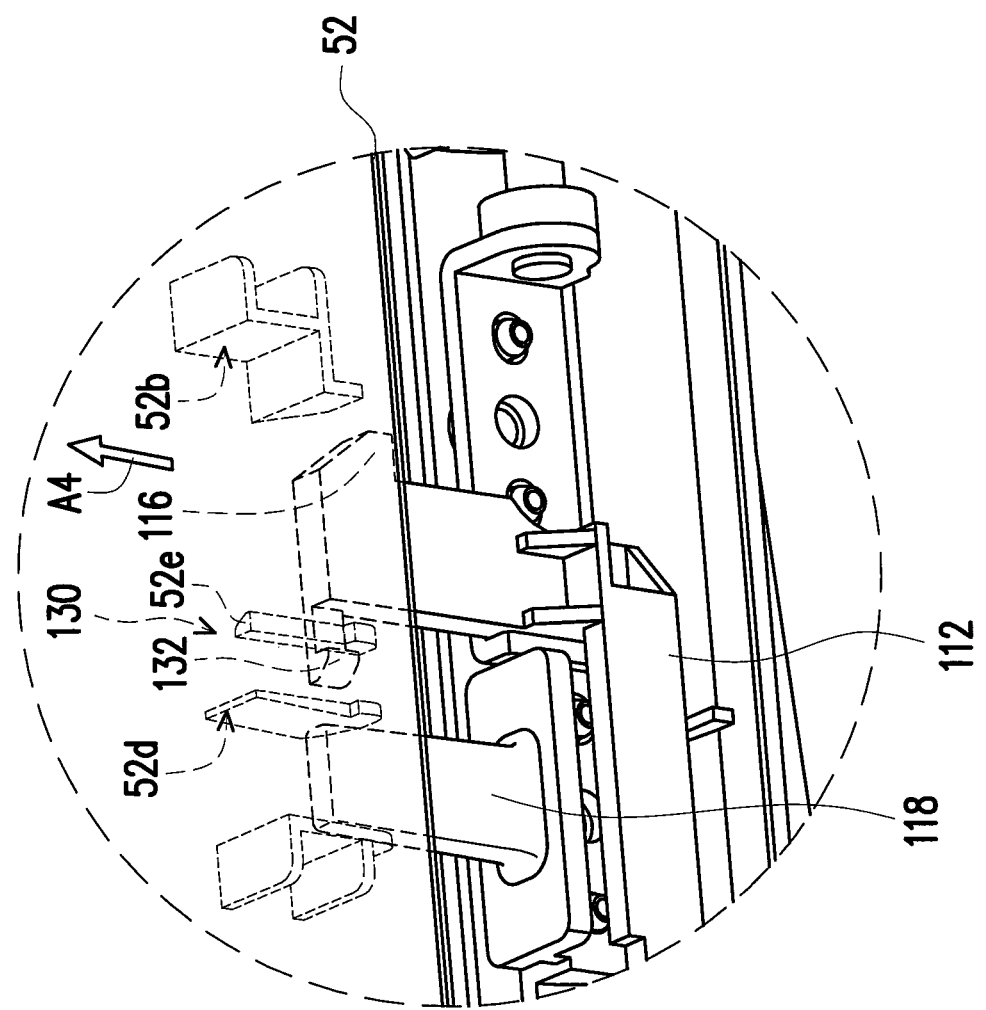
Figure 5G:
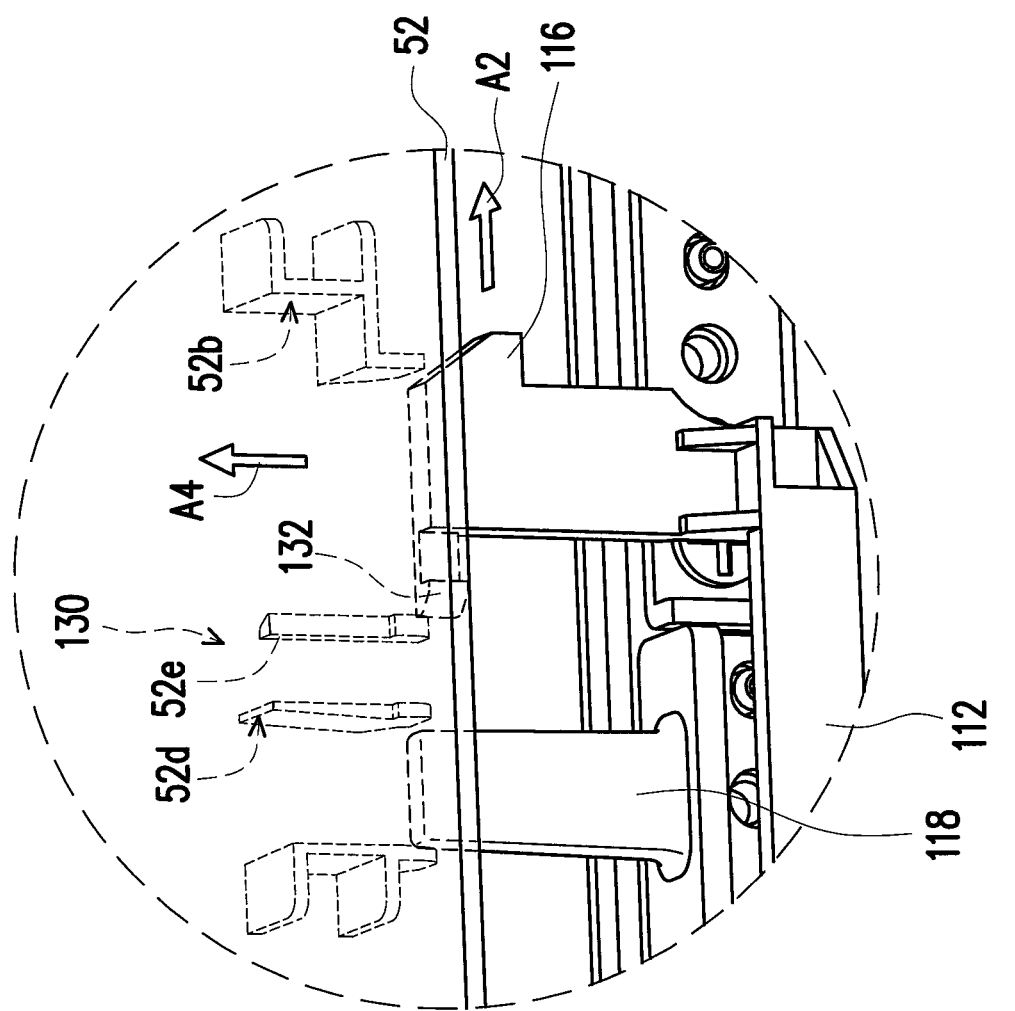

FIGS. 5E-5G are respective partial enlarged views of the electronic device being removed from the docking station. With reference to FIGS. 2, 3, 4, and 5E-5G, in the present embodiment, the secondary hook mechanism 130 is connected to the bracket 110. When the pushing element 112 slid relative to the housing 111 so the main hook 116 departs from the main groove 52b, the main hook relation between the bracket 110 and the electronic device 52 is removed. Moreover, the secondary hook mechanism 130 establishes a secondary hook relation between the bracket 110 and the electronic device 52, thereby ensuring the release of the main hook relation between the bracket 110 and the electronic device 52. While in the state of establishing the secondary hook relation between the bracket 110 and the electronic device 52, when the electronic device 52 is removed from the bracket 110 until the secondary hook relation between the bracket 110 and the electronic device 52 is released, the restoring element 114 restores the pushing element 112 relative to the housing 111.

To be specific, the pushing element 112 of the present embodiment has a moving block 112a, as shown in FIG. 2 or 3. The housing 111 has an opening 111d, and the moving block 112a can be movably inserted through the opening 111d, such that the pushing element 112 receives an external force through the moving block 112a and slides in the opening 111d relative to the housing 111. Specifically, the secondary hook mechanism 130 of the present embodiment includes a secondary hook 132 fixed to the pushing element 112. The electronic device 52 also has a stopping element 52e, in which the secondary hook 132 hooks to the stopping element 52e.

When the main hook relation shown in FIG. 5D is established between the bracket 110 and the electronic device 52, the secondary hook 132 is not hooked to the stopping element 52e. Thereafter, when the pushing element 112 receives an external force through the moving block 112a and slides along a direction of an arrow A3 shown in FIG. 5E relative to the housing 111 so the main hook 116 departs from the main groove 52b, and the secondary hook 132 hooks to the stopping element 52e, the electronic device 52 is removed from the bracket 110 along an extended direction of the stopping element 52e. That is, the electronic device 52 is removed from the bracket 110 along a direction of an arrow A4 shown in FIG. 5F until the secondary hook relation between the secondary hook 132 and the stopping element 52e is released, as shown in FIG. 5G. Moreover, the restoring element 114 restores the pushing element 112 relative to the housing 111, thereby ensuring the secondary hook relation between the bracket 110 and the electronic device 52 is released.

Under this configuration, by pushing the moving block 112a so the pushing element 112 slides relative to the housing 111 until the main hook relation between the bracket 110 and the electronic device 52 is released, the user can remove the electronic device 52 from the bracket 110. At the same time, the secondary hook mechanism 130 is employed to establish the secondary hook relation between the bracket 110 and the electronic device 52, such that the pushing element 112 no longer slides relative to the housing 111, and the release of the main hook relation between the bracket 110 and the electronic device 52 is ensured. Therefore, the user only needs to make sure that the electronic device 52 is removed from the bracket 110, but no other external force is required to prevent the sliding of the pushing element 112 relative to the housing 111. Accordingly, the user can remove the electronic device 52 from the bracket 110 using only one hand, without the need of the other hand to ensure the release of the main hook relation between the electronic device 52 and the bracket 110. Moreover, as shown in FIG. 5G, when the electronic device 52 is removed from the docking station 100 until the secondary hook relation between the secondary hook 132 and the stopping element 52e is released, the restoring element 114 of the present embodiment can restore the pushing element 112 relative to the housing 111. Accordingly, the user does not need to apply another external force for the self-restoration of the secondary hook mechanism 130 of the bracket 110.

In the embodiments described above, by adding the stopping element 52e in the electronic device 52, the secondary hook 132 of the bracket 110 hooks to the stopping element 52e and establishes the secondary hook relation between the bracket 110 and the electronic device 52, thereby helping the removal of the electronic device 52 from the bracket 110. However, the invention does not limit the methods of establishing the secondary hook relation between the bracket 110 and the electronic device 52. Further description is provided below with reference to the drawings.

Figure 6A:
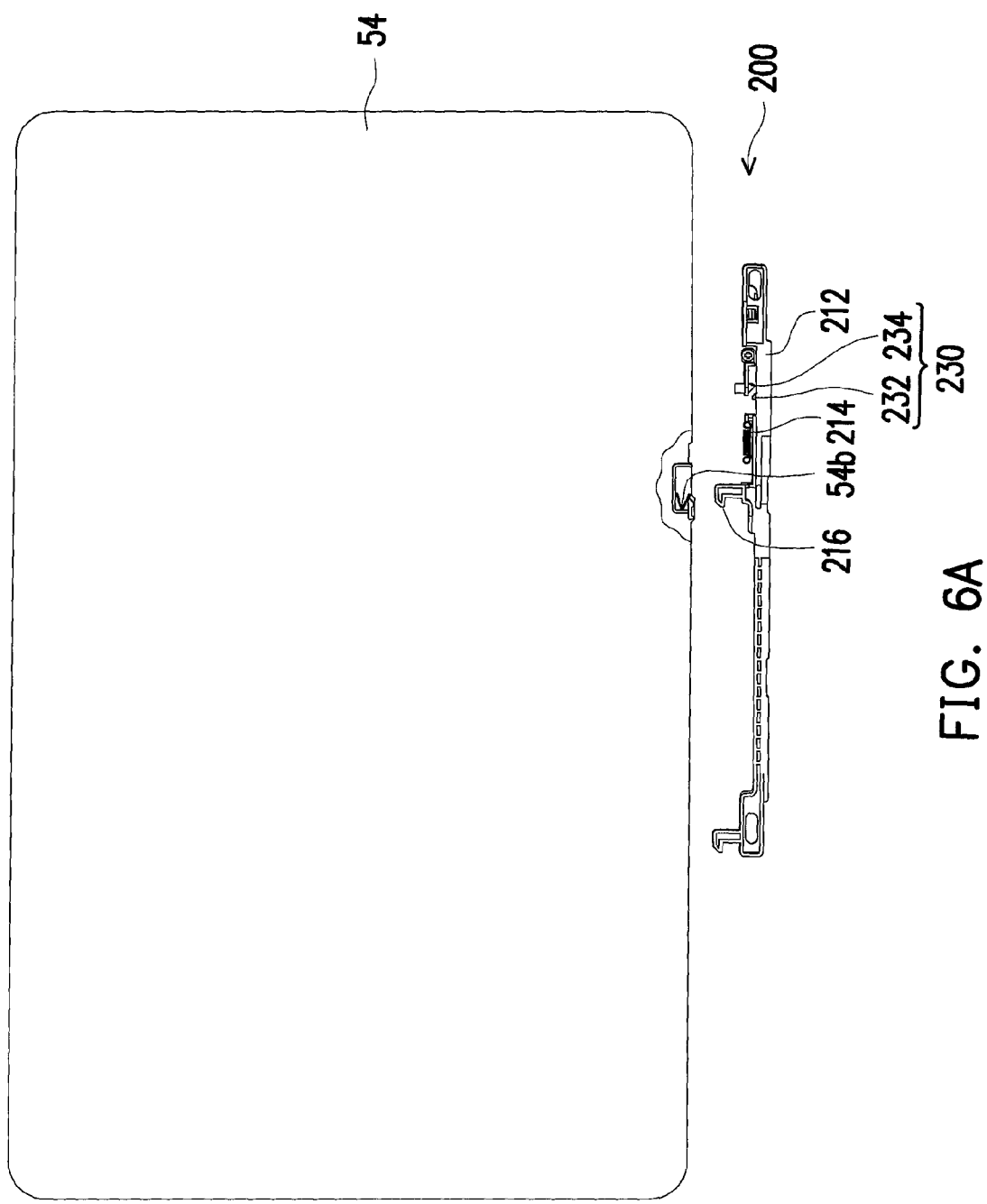
FIGS. 6A and 6B are respective schematic views of the electronic device and the docking station before assembly and after assembly.
Figure 6B:
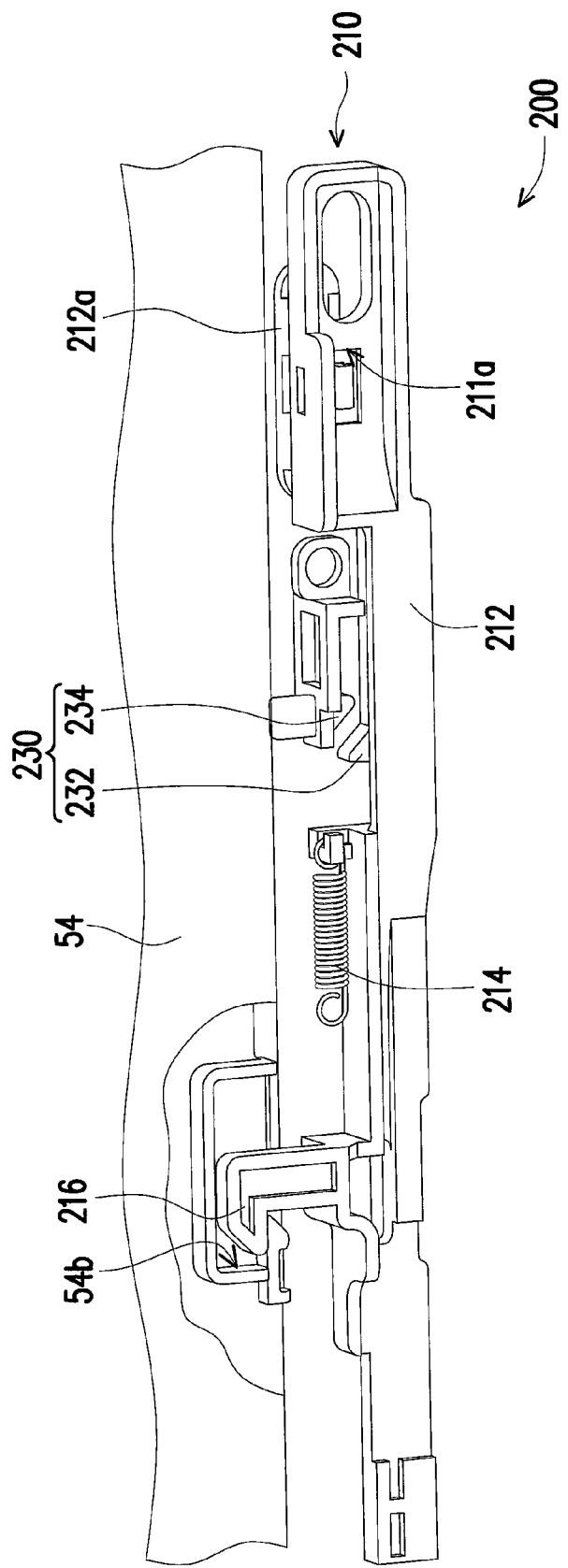

FIGS. 6A and 6B are respective schematic views of the electronic device and the docking station before assembly and after assembly. With reference to FIGS. 6A and 6B, in the present embodiment, the electronic system 50 includes an electronic device 54 and a docking station 200. The docking station 200 includes a bracket 210, a base (not drawn), and a secondary hook mechanism 230. The bracket 210 includes a housing (not drawn), a pushing element 212, a restoring element 214, and a main hook 216. The mechanisms and functions of the base and housing of the electronic system 50 in the present embodiment is the same or similar to the functions and structures of the base 120 and housing 111 of the electronic system 50 in the first embodiment. That is, the base is pivotally disposed to the bracket 210, and the housing also has the housing structure described in the earlier embodiments. Accordingly, the detailed description and design can be referenced by the description of FIG. 1A to FIG. 5G, and thus further elaboration thereof is omitted hereafter.

In the present embodiment, the pushing element 212 can be slidably disposed in the housing. The main hook 216 is fixed to the pushing element 212. The restoring element 214 is disposed between the housing and the pushing element 212 to restore the pushing element 212 relative to the housing.

Figure 7A:
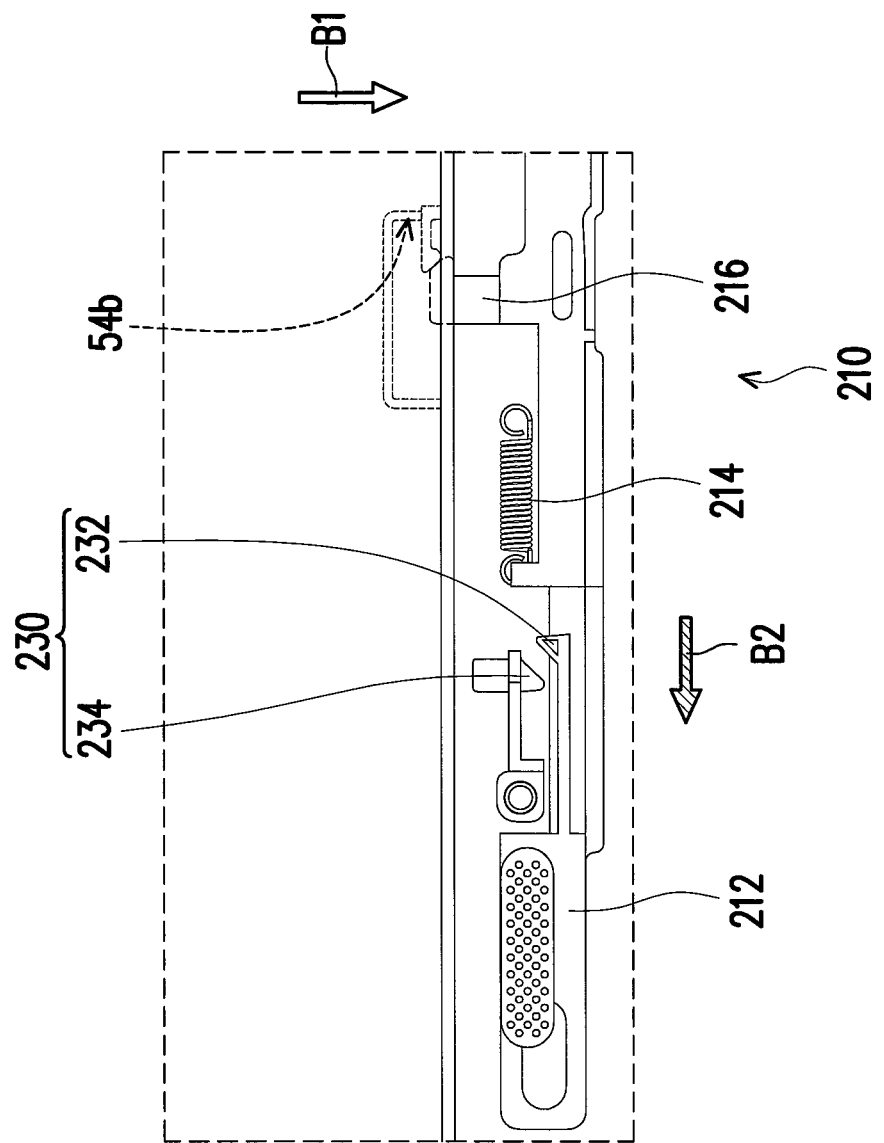
FIGS. 7A-7E are schematic views of the electronic device and the docking station in different states of disassembly.
Figure 7B:
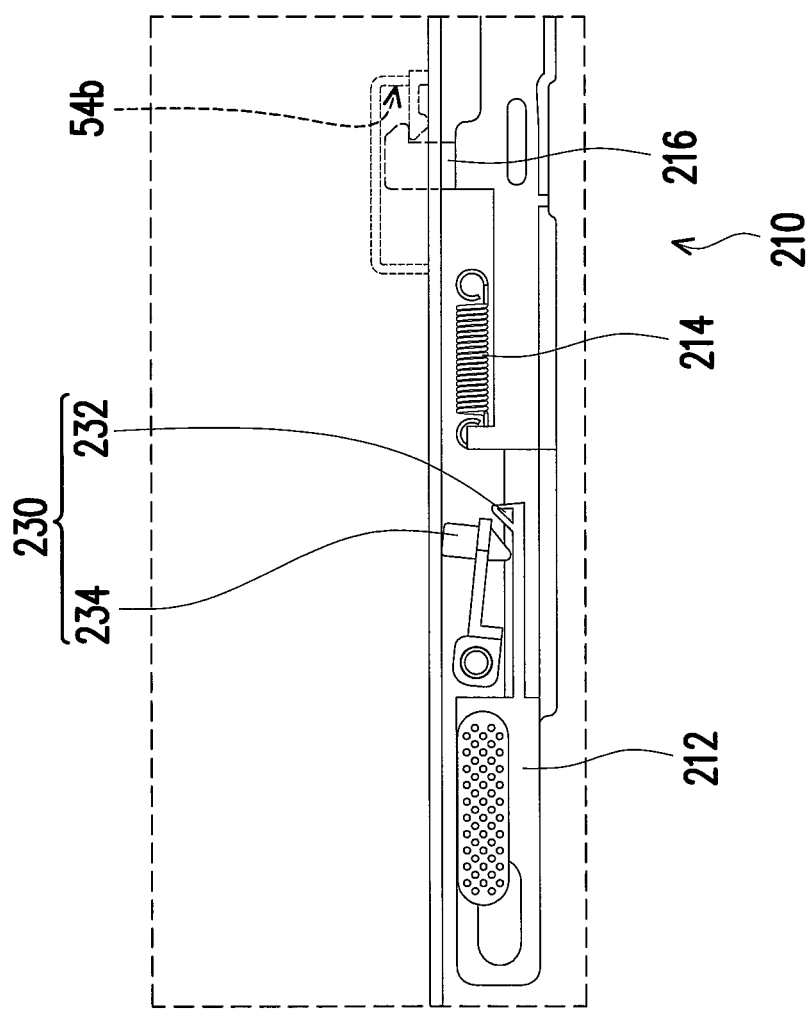

FIGS. 7A-7E are schematic views of the electronic device and the docking station in different states of disassembly. With reference to FIGS. 6A, 6B, 7A, and 7E, in the present embodiment, the electronic device 54 has a main groove 54b. The main groove 54b is suitable for buckling to main hook 216 of the bracket 210. The electronic device 54 of the present embodiment is assembled to the docking station 210 along a direction of an arrow B1 shown in FIG. 7A. The electronic device 54 then engages the main hook 116, so that the pushing element 212 slides relative to the housing along a direction of an arrow B2. When the pushing element 212 is slid relative to the housing through the restoring element 214 at the location shown in FIG. 7B so the main hook 216 is buckled to the main groove 54b, a main hook relation between the bracket 210 and the electronic device 54 is established, as shown in FIG. 7B. Accordingly, the assembly of the electronic device 54 to the bracket 210 is essentially complete. To assemble the electronic device 54 to the bracket 210 of the docking station 200 with this configuration, the user only needs to ensure the hook relation between the main groove 54b of the electronic device 54 and the main hook 216 of the docking station 200.

In the present embodiment, the secondary hook mechanism 230 is connected to the bracket 210. When the pushing element 212 is slid relative to the housing so the main hook 216 departs from the main groove 54b, the main hook relation between the bracket 210 and the electronic device 54 is removed. Moreover, the secondary hook 230 establishes a secondary hook relation between the bracket 210 and the electronic device 54, thereby ensuring the release of the main hook relation between the bracket 210 and the electronic device 54. While in the state of establishing the secondary hook relation between the bracket 210 and the electronic device 54, when the electronic device 54 is removed from the bracket 210 until the secondary hook relation between the bracket 210 and the electronic device 54 is released, the restoring element 214 restores the pushing element 212 relative to the housing.

To be specific, the pushing element 212 of the present embodiment has a moving block 212a. The housing has an opening 211a, and the moving block 212a can be movably inserted through the opening 211a, such that the pushing element 212 receives an external force through the moving block 212a and slides in the opening 211a relative to the housing. Specifically, the secondary hook mechanism 230 of the present embodiment includes a secondary hook 234 and a stopping protrusion 232. The secondary hook 234 can be movably disposed to the housing. To be specific, the secondary hook 234 of the present embodiment is pivotally disposed to the housing. On the other hand, the stopping protrusion 232 is fixed to the pushing element 212.

Figure 7C:
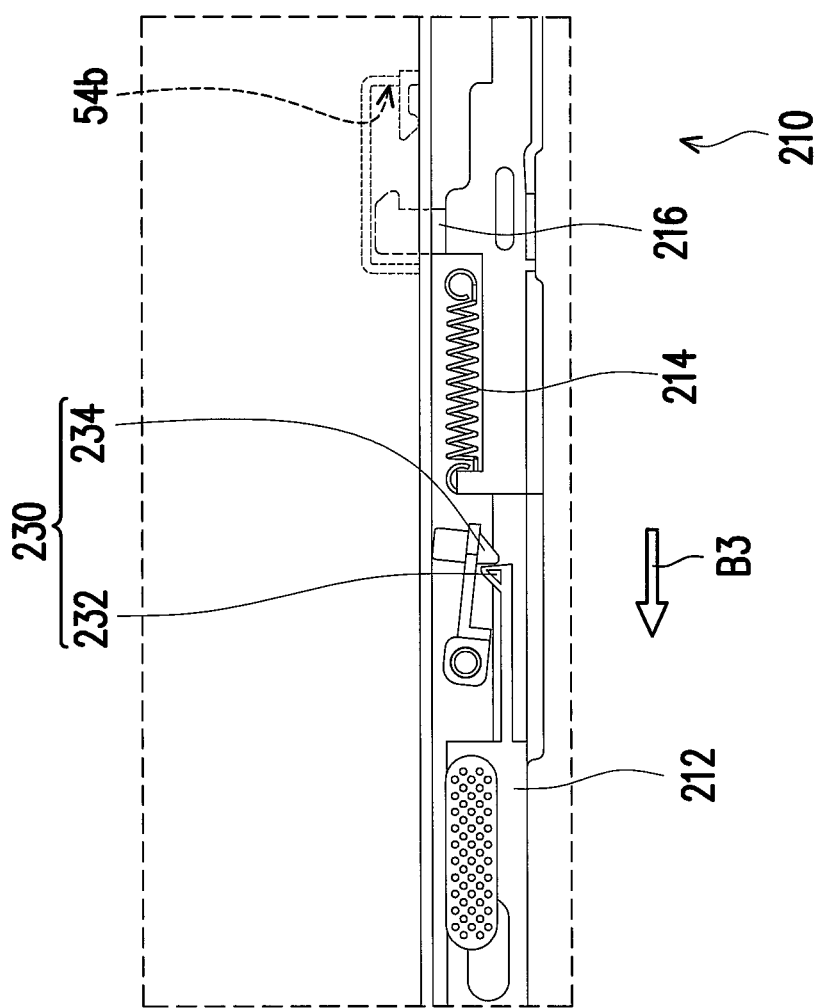
Figure 7D:
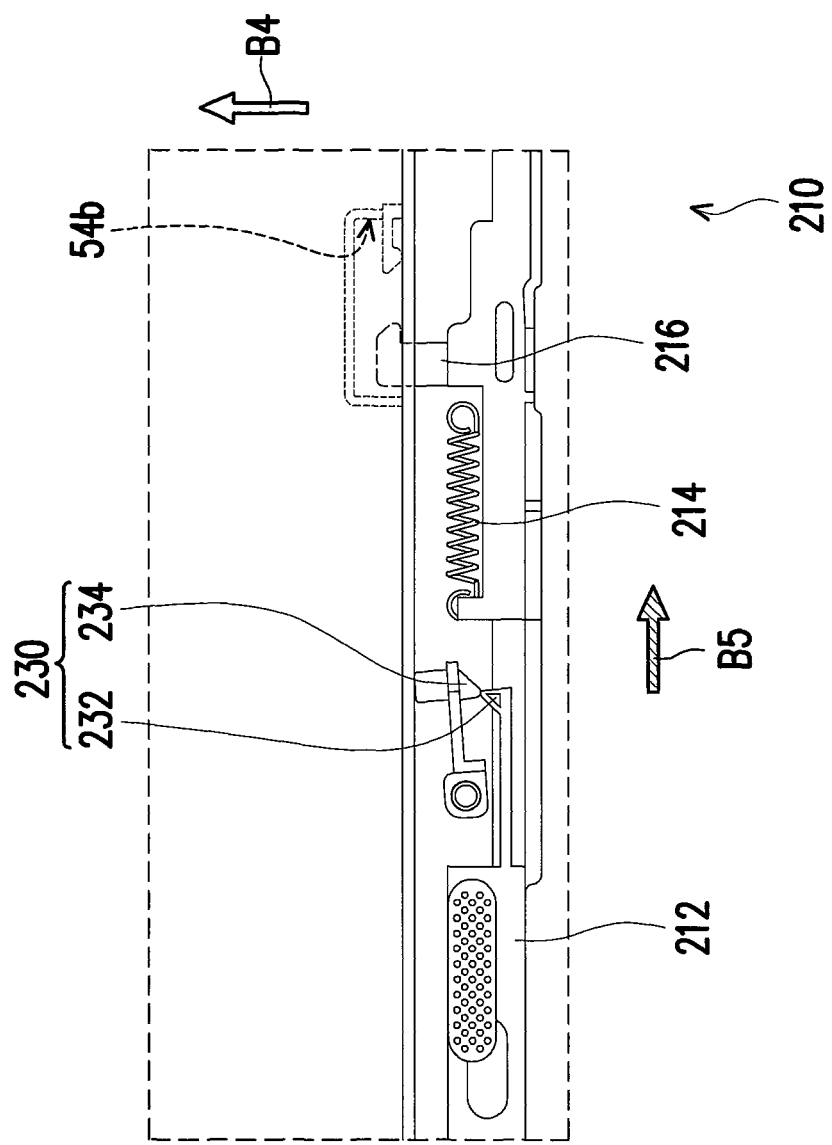
Figure 7E:
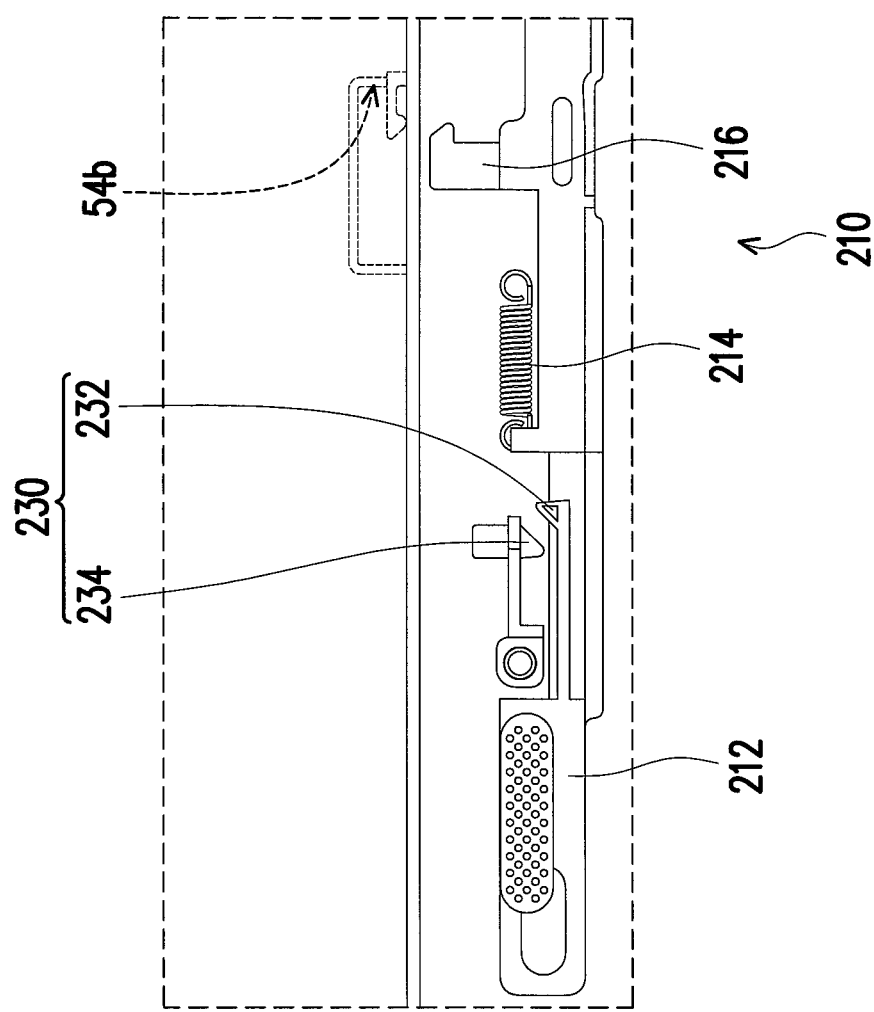

When the main hook relation shown in FIG. 7B is established between the bracket 210 and the electronic device 54, the secondary hook 234 is not hooked to the stopping protrusion 232 and is clamped by the electronic device 54, such that the secondary hook 234 engages the pushing element 212. The pushing element 212 then receives an external force through the moving block 212a along a direction of an arrow B3 and is slid relative to the housing so the main hook 216 departs from the main groove 54b, such that the secondary hook 234 hooks to the stopping protrusion 232 as shown in FIG. 7C. Thereafter, as shown in FIG. 7D, the electronic device 54 is gradually removed from the bracket 210 along a direction of an arrow B4. At the same time, the restoring element 214 restores the pushing element 212 relative to the housing along a direction of an arrow B5, until the secondary hook relation between the secondary hook 234 and the stopping protrusion 232 is released, as shown in FIG. 7E. Accordingly, the release of the secondary hook relation between the bracket 210 and the electronic device 54 is ensured. Therefore, the user only needs to make sure that the electronic device 54 is removed from the bracket 210, but no other external force is required to prevent the sliding of the pushing element 212 relative to the housing. Accordingly, the user can remove the electronic device 54 from the docking station 200 using only one hand, without the need of the other hand to ensure the release of the main hook relation between the electronic device 54 and the bracket 210. Moreover, as shown in FIG. 7E, when the electronic device 54 is removed from the bracket 210 until the secondary hook relation between the secondary hook 234 and the stopping element 52e is released, the restoring element 214 of the present embodiment can restore the pushing element 212 relative to the housing. Accordingly, the user does not need to employ another external force for the self-restoration of the secondary hook 234 of the secondary hook mechanism 230 in the bracket 210.

In the description below, the electronic system 50 of FIG. 1A to FIG. 5G is used as an illustrative example to describe an operating method of releasing connection between two devices. A first device is a electronic device 52, or a tablet PC, and a second device is a docking station 100.

The operating method of releasing connection between two devices in the present embodiment is adapted for detaching the electronic device 52 from the docking station 100 with one hand. The operating method includes the following steps.

A pushing element 112 is moved to a unlock position, as shown in FIG. 5E. The main hook relation between the electronic device 52 and the docking station 100 is then released. Moreover, the secondary hook relation between the electronic device 52 and the docking station 100 is established, such that the pushing element 112 stays at the unlock position and no longer slides relative to the housing 111.

Referring to FIGS. 5F and 5G, a single force is applied to the electronic device 52 so the electronic device 52 is dismounted from the docking station 100. Accordingly, the user only needs one hand to remove the electronic device 52 from the docking station 100. The user does not need the other hand to ensure the release of the main hook relation between the electronic device 52 and the docking station 100.

In establishing the main hook relation between the docking station 100 and the electronic device 52, the electronic device 52 has a main groove 52b, for instance as shown in FIG. 5A. Moreover, as shown in FIG. 4, the docking station 100 further includes a main hook 116 and a secondary hook mechanism 130, and the main hook 116 is fixed to the pushing element 130. When the pushing element 112 is slid relative to the housing 111 so the main hook 116 is buckled to the main groove 52b, a main hook relation between the docking station 100 and the electronic device 52 is established, thereby assembling the electronic device 52 to the docking station 100.

Specifically, the secondary hook mechanism 130 of the present embodiment includes a secondary hook 132 fixed to the pushing element 112. The electronic device 52 also has a stopping element 52e.

The steps of releasing the main hook relation between the electronic device 52 and the docking station 100, and establishing the secondary hook relation between the electronic device 52 and the docking station 100, such that the pushing element 112 stays at the unlock position and no longer slides relative to the housing 111 are shown in FIG. 5E, for example. In FIG. 5E, when the pushing element 112 is slid so the main hook 116 departs from the main groove 52b, the secondary hook 132 hooks to the stopping element 52e.

In the step of applying a single force to the electronic device 52 so the electronic device 52 is dismounted from the docking station 100, the electronic device 52 is removed from the docking station 100 along an extended direction of the stopping element (e.g. the direction of the arrow A4 in FIG. 5F) until the secondary hook relation between the secondary hook 132 and the stopping element 52e is released.

It should be noted that, although the electronic system 50 of FIG. 1A to FIG. 5G is used to describe an operating method of releasing connection between two devices according to an embodiment of the invention, the implementation of the electronic system 50 is not limited to the afore-described embodiments. For example, a variation of the foregoing embodiments can be seen in the secondary hook mechanism 230 of FIG. 6A, which includes a stopping protrusion 232 and a secondary hook 234. Accordingly, an operating method of releasing connection between two devices can be similarly deduced from the electronic system 50 shown in FIG. 6A to 7E.

In view of the foregoing, by adding the secondary hook mechanism of the docking station and the operating method of releasing connection between two devices performed by the secondary hook mechanism, embodiments of the invention can enhance the convenience of removing the electronic device from the bracket. When the main hook relation between the bracket and the electronic device is released so the user can remove the electronic device from the bracket, at the same time, due to the secondary hook relation being established between the bracket and the electronic device, the pushing element no longer slides relative to the housing, and the release of the main hook relation between the bracket and the electronic device is ensured. Accordingly, the user does not need to apply other external force to prevent the sliding of the pushing element relative to the housing, and the user only needs to make sure that the electronic device is removed from the bracket. Therefore, the user can remove the electronic device from the docking station using only one hand, without the need of the other hand to ensure the release of the main hook relation between the electronic device and the docking station.

Moreover, when the electronic device is removed from the docking station until the secondary hook relation between the bracket and the electronic device is released, the restoring element can restore the pushing element relative to the housing. Accordingly, the user does not need to apply other external force for the self-restoration of the secondary hook mechanism of the bracket.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A docking station suitable for detachably assembling to an electronic device, the electronic device having a main groove, the docking station comprising:
    a bracket, comprising:
    a housing;
    a pushing element slidably disposed in the housing;
    a restoring element disposed between the housing and the pushing element to restore the pushing element relative to the housing; and
    a main hook fixed to the pushing element and suitable for buckling to the main groove, when the pushing element is slid relative to the housing through the restoring element so the main hook is buckled to the main groove, a main hook relation between the bracket and the electronic device is established; and
    a secondary hook mechanism connected to the bracket, when the pushing element is slid relative to the housing so the main hook departs from the main groove, the main hook relation between the bracket and the electronic device is released, and the secondary hook mechanism establishes a secondary hook relation between the bracket and the electronic device, and when the electronic device is removed from the bracket until the secondary hook relation between the bracket and the electronic device is released, the restoring element restores the pushing element relative to the housing.

2. The docking station of claim 1, wherein the secondary hook mechanism comprises a secondary hook fixed to the pushing element, the electronic device further having a stopping element, the secondary hook is suitable for hooking to the stopping element, and when the main hook relation is established between the bracket and the tablet device, the secondary hook is not hooked to the stopping element, and when the pushing element is slid relative to the housing so the main hook departs from the main groove, and the secondary hook hooks to the stopping element, the electronic device is removed from the bracket along an extended direction of the stopping element until the secondary hook relation between the secondary hook and the stopping element is released.

3. The docking station of claim 1, wherein the secondary hook mechanism comprises a stopping protrusion and a secondary hook, the stopping protrusion is fixed to the pushing element, the secondary hook is movably disposed to the housing, and when the main hook relation is established between the bracket and the electronic device, the secondary hook is not hooked to the stopping protrusion and is suitable for being clamped by the electronic device, such that the secondary hook engages the pushing element, and when the pushing element is slid relative to the housing so the main hook departs from the main groove, and the secondary hook hooks to the stopping protrusion, the electronic device is removed from the bracket until the secondary hook relation between the secondary hook and the stopping protrusion is released.

4. The docking station of claim 3, wherein the secondary hook is pivotally disposed to the housing.

5. The docking station of claim 1, further comprising:
    a supporting element fixed to the pushing element, the tablet device having a fastening groove, and the supporting element is suitable for inserting in the fastening groove to support the electronic device.

6. The docking station of claim 1, wherein the pushing element has a moving block, the housing has an opening, and the moving block is movably inserted through the opening, such that the pushing element receives an external force through the moving block and slides in the opening relative to the housing.

7. The docking station of claim 1, further comprising:
    a bracket connector disposed to the bracket, the tablet device further having a device connector, and the bracket connector is suitable for electrically connecting to the device connector.

8. The docking station of claim 1, further comprising:
    a base pivotally disposed to the bracket.

9. The docking station of claim 8, wherein the base comprises a keyboard.

10. An electronic system, comprising:
    an electronic device having a main groove; and
    a docking station suitable for detachably assembling to the electronic device, the docking station comprising:
    a bracket, comprising:
    a housing;
    a pushing element slidably disposed in the housing;
    a restoring element disposed between the housing and the pushing element to restore the pushing element relative to the housing; and
    a main hook fixed to the pushing element and suitable for buckling to the main groove, when the pushing element is slid relative to the housing through the restoring element so the main hook is buckled to the main groove, a main hook relation between the bracket and the electronic device is established; and
    a secondary hook mechanism connected to the bracket, when the pushing element is slid relative to the housing so the main hook departs from the main groove, the main hook relation between the bracket and the electronic device is released, and the secondary hook mechanism establishes a secondary hook relation between the bracket and the electronic device, and when the tablet device is removed from the bracket until the secondary hook relation between the bracket and the electronic device is released, the restoring element restores the pushing element relative to the housing.

11. The electronic system of claim 10, wherein the secondary hook mechanism comprises a secondary hook fixed to the pushing element, the electronic device further having a stopping element, the secondary hook is suitable for hooking to the stopping element, and when the main hook relation is established between the bracket and the electronic device, the secondary hook is not hooked to the stopping element, and when the pushing element is slid relative to the housing so the main hook departs from the main groove, and the secondary hook hooks to the stopping element, the electronic device is removed from the bracket along an extended direction of the stopping element until the secondary hook relation between the secondary hook and the stopping element s released.

12. The electronic system of claim 10, wherein the secondary hook mechanism comprises a stopping protrusion and a secondary hook, the stopping protrusion is fixed to the pushing element, the secondary hook is movably disposed to the housing, and when the main hook relation is established between the bracket and the electronic device, the secondary hook is not hooked to the stopping protrusion and is clamped by the electronic device, such that the secondary hook engages the pushing element, and when the pushing element is slid relative to the housing so the main hook departs from the main groove, and the secondary hook hooks to the stopping protrusion, the electronic device is removed from the bracket until the secondary hook relation between the secondary hook and the stopping protrusion is released.

13. The electronic system of claim 12, wherein the secondary hook is pivotally disposed to the housing.

14. The electronic system of claim 10, further comprising:
a supporting element fixed to the pushing element, the electronic device having a fastening groove, and the supporting element is inserted in the fastening groove to support the electronic device.

15. The electronic system of claim 10, wherein the pushing element has a moving block, the housing has an opening, and the moving block is movably inserted through the opening, such that the pushing element receives an external force through the moving block and slides in the opening relative to the housing.

16. The electronic system of claim 10, further comprising:
a bracket connector disposed to the bracket, the electronic device further having a device connector, and the bracket connector is electrically connected to the device connector.

17. The electronic system of claim 10, further comprising:
a base pivotally disposed to the bracket.

18. The electronic system of claim 17, wherein the base comprises a keyboard.

19. An operating method of releasing connection between two devices, adapted for detaching a first device from a second device with one hand, the second device having a housing, the operating method of releasing connection between two devices comprising:
moving a pushing element to a unlock position to release a main hook relation between the first device and the second device and to establish a secondary hook relation between the first device and the second device, such that the pushing element stays at the unlock position and no longer slides relative to the housing under the secondary hook relation; and
applying a single force to the first device so the first device is dismounted from the second device and the secondary hook relation is released under the dismounting of the first device from the second device.

20. The operating method of claim 19, wherein the first device has a main groove, the second device further comprising a main hook and a secondary hook mechanism, and the main hook is fixed to the pushing element and buckled to the main groove to establish the main hook relation between the second device and the main hook of the first device.

21. The operating method of claim 20, wherein the first device further has a stopping element, the second mechanism comprising a secondary hook fixed to the pushing element, and wherein the step of releasing the main hook relation between the first device and the second device and establishing the secondary hook relation between the first device and the second device, such that the pushing element stays at the unlock position and no longer slides relative to the housing comprises:
when the pushing element is slid so the main hook departs from the main groove, hooking the secondary hook to the stopping element.

22. The operating method of claim 21, wherein the first device is removed from the second device along an extended direction of the stopping element until the secondary hook relation between the secondary hook and the stopping element is released.

23. The operating method of claim 20, wherein the secondary hook mechanism comprises a stopping protrusion and a secondary hook, the stopping protrusion is fixed to the pushing element, the secondary hook is movably disposed to the housing, and wherein the step of releasing the main hook relation between the first device and the second device and establishing the secondary hook relation between the first device and the second device, such that the pushing element stays at the unlock position and no longer slides relative to the housing comprises:
when the pushing element is slid so the main hook departs from the main groove, hooking the secondary hook to the stopping protrusion.

24. The operating method of claim 23, wherein the first device is removed from the second device until the secondary hook relation between the secondary hook and the stopping protrusion is released.

25. The operating method of claim 19, wherein the first device is a tablet PC, and the second device is a docking station.

* * * * *